United States Patent Office 3,511,618
Patented May 12, 1970

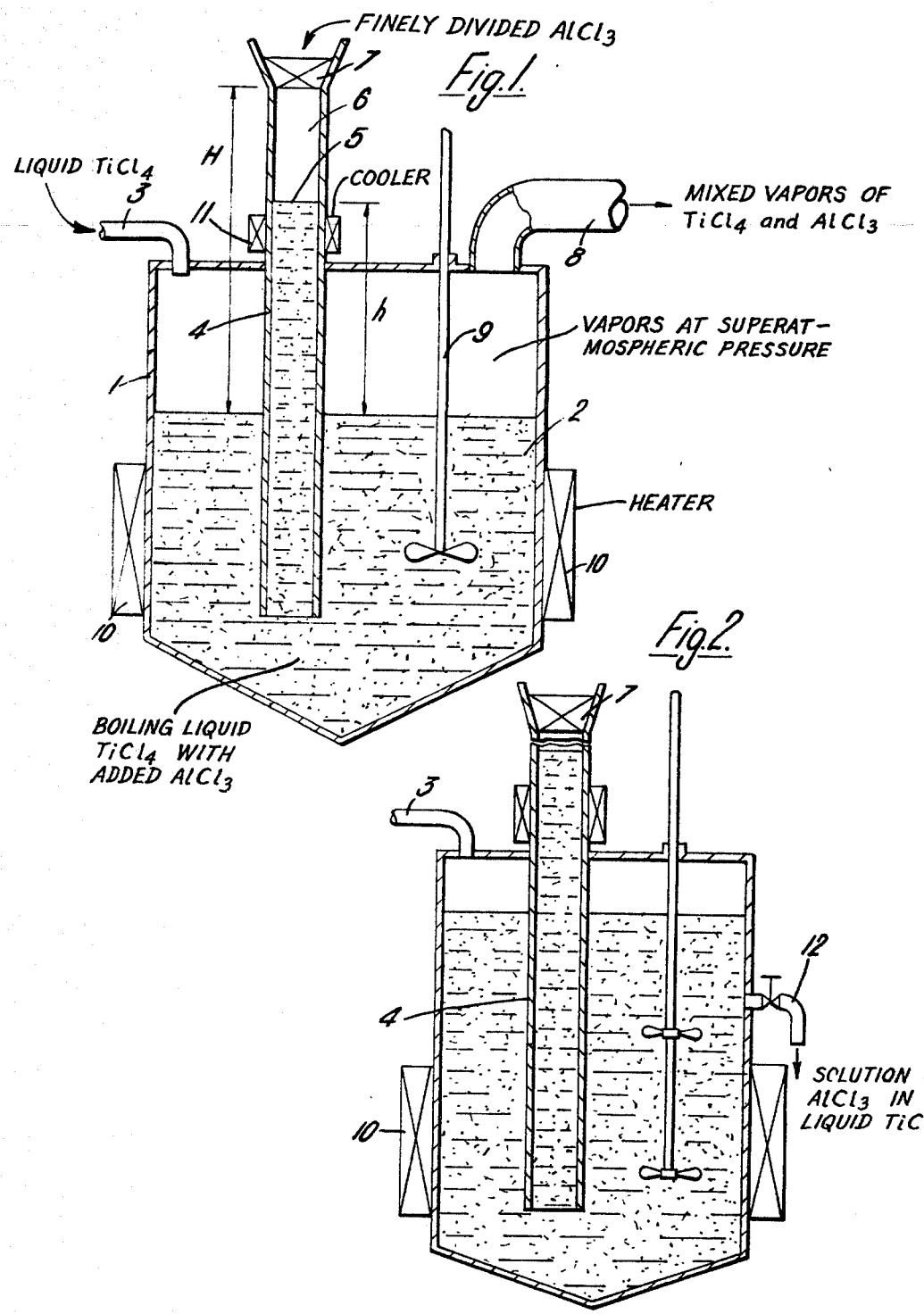

3,511,618
MIXED VAPORS OF TiCl₄ AND AlCl₃
André Louis Michaud, Vieux-Thann, and Robert Jean Mas, Thann, Haut-Rhin, France, assignors to Fabriques de Produits Chimiques de Thann et de Mulhouse, Thann, Haut-Rhin, France, a French body corporate
Filed July 26, 1966, Ser. No. 567,968
Claims priority, application France, July 26, 1965, 26,016
Int. Cl. B01f 3/02; C09c 1/36
U.S. Cl. 23—293                    6 Claims

ABSTRACT OF THE DISCLOSURE

Solid aluminium trichloride is introduced into liquid titanium tetrachloride via a dip tube which penetrates below the surface of liquid titanium tetrachloride maintained at its boiling point in a closed vessel. The super-atmospheric pressure generated in the vessel maintains a column of liquid in the dip tube, the top of the column of liquid being above the level of the liquid in the vessel and at atmospheric pressure. The column of the liquid preferably extends into an upper portion of the tube above the vessel which is cooled to inhibit evaporation of the liquid from the column. The titanium tetrachloride/aluminuium trichloride mixture may be withdrawn as a liquid of a vapour and the mixing process may be operated continuously.

---

This invention relates to an improved method of feeding a solid into a liquid maintained under pressure.

The introduction of materials into a system under super-atmospheric pressure frequently gives rise to operational difficulties, and these become particularly pronounced when the vapour of the liquid must be rigorously excluded from contact with the air. An industrial process in which this problem occurs, and to which this invention is particularly directed, is the addition of aluminium trichloride to the liquid titanium tetrachloride used in the vapour phase production of titania. In the production of titania it is necessary to evaporate the liquid titanium tetrachloride in order to introduce it into the reaction zone as a vapour, and since the titanium chloride vapours are extremely readily hydrolysed the slightest leak in the evaporating system causes considerable fumes comprising vapourized titanium chloride, finely divided titanium oxide, and hydrochloric acid. These fumes are, of course, undesirable because they contaminate the atmosphere, cause considerable corrosion of adjoining equipment, and finally because they act as irritants and cannot be tolerated by the personnel operating the equipment.

Hence titanium tetrachloride evaporators, of whatever type, have to be particularly leakproof, which leads to difficulties when it is desired to add materials (such as AlCl₃) tot h liquid TiCl₄ in order that they may be incorporated into the TiCl₄ vapour.

One way in which this can be overcome is to dissolve the aluminium trichloride in the titanium tetrachloride in such proportions that the vapour produced by the evaporation of the solution contains the desired amount of aluminium. This operation can, for example, be carried out in a mixer fitted with a stirrer and a heating system; it is carried out batchwise and the solutions so obtained are passed into a vessel which itself feeds the titanium tetrachloride evaporator by means of a pipeline and a leakproof valve system. This solution is reliable because it makes it possible to introduce a definite amount of the aluminium trichloride solution into the titanium tetrachloride, but it has the disadvantage of being discontinuous and needing considerable additional equipment associated with the evaporator.

Another, more elegant solution consists of feeding the evaporator continuously with the requisite amounts of titanium tetrachloride and aluminium trichloride. No difficulty arises in feeding the titanium tetrachloride, but difficulties are present with the aluminium trichloride since this is present in a more or less divided solid stage, and therefore has to be introduced into the evaporator through a suitable opening. Since the evaporator is under pressure and contains boiling titanium tetrachloride which has a tendency to condense on all the cold parts of the equipment, and since aluminium trichloride is itself hydrolysable and tends to become pasty and form lumps when it is wetted by any liquid, it is apparent that this introduction poses problems which are difficult to resolve without the use of complicated equipment.

The present invention provides an improved process for the introduction of a solid into a liquid in a zone of super-atmospheric pressure which comprises adding the solid to the said liquid via the upper end of a column of the liquid intergral with the main mass of liquid whose height is such that the said column is in equilibrium, the upper end being at atmospheric pressure and the lower end at the super-atmospheric pressure prevailing in the said zone. This process is very suited to the addition of aluminium trichloride to titanium tetrachloride (and is described herein in relation to such an application), but it is nonetheless generally applicable to all applications where it is desired to add a solid to a liquid under pressure provided that the solid is not both insoluble in, and of lesser density than, the liquid.

In most applications of the present process it is convenient to maintain the super-atmospheric pressure by boiling the liquid, and this has the added advantage that the normal flow irregularities in boiling produce an oscillation of the liquid column which prevents accumulation of the solid at the upper end of the column retaining tube and also helps to distribute the solid throughout the column and thence throughout the entire mass of liquid material. Often it is also convenient to arrange the level of the liquid so that the upper end of the liquid column is external to the zone of super-atmospheric pressure, and when the liquid is boiled using such a modification it is generally useful to cool the exposed upper end of the liquid column in order to keep the vapour pressure of the liquid (and hence potential evaporation) to a minimum. The process is, of course, applicable both to applications where it is necessary to withdraw the mixed product in the form of a vapour, and to those applications where the product is withdrawn as a liquid.

A diagrammatic representation of an apparatus suitable for carrying out the process of this invention is given in the accompanying drawings, in which:

FIG. 1 shows a vertical schematic section of an apparatus for use in the invention used to produce a gaseous mixture, whilst, FIG. 2 shows a schematic section of an apparatus used to produce a liquid product.

Referring to the drawings;

FIG. 1 shows the evaporator 1, of cylindrical-conical form, containing the boiling liquid 2, which is introduced into the tank at 3, and maintained at a suitable level. The dip tube 4 is immersed deeply in the liquid, and its height H above the liquid level in the evaporator is greater than the height h of the liquid column which forms as a result of the super-atmospheric pressure prevailing inside the tank 1. This dip tube is in its upper part equipped with a sieve, shown very schematically at 7, which allows the solid to be fed in. The apparatus comprises also an outlet 8 for the gaseous mixture produced, a stirrer 9, a heating system 10 in the evaporator and a cooling system 11 for that part of the liquid column which is outside the evaporator.

FIG. 2 shows an apparatus very similar to that of FIG. 1, and differs therefrom only in that the outlet 8 for gaseous product is replaced by an outlet 12, located below the level of liquid 2, by which liquid product can be withdrawn.

The invention is illustrated in the following example.

EXAMPLE

A cylindrical-conical evaporator of 860 litres capacity, diameter 1000 mm., and total height 2,550 mm., is employed, in which 1300 kg. of $TiCl_4$ are continuously boiled at 143° C. at a gauge pressure of 200 grammes per cm.$^2$ by means of a coil of 8 m.$^2$ heating surface through which oil entering at 180° C. and leaving at 160° C. is circulated.

Vapour is withdrawn at the rate of 350 kg./hour, through an orifice located in the upper part of the evaporator. The evaporated $TiCl_4$ is continuously replaced by adding $TiCl_4$ at ambient temperature at the rate of 350 kg./hour, controlled by a flow meter. 3.5 kg. batches of anhydrous aluminium trichloride of particle size up to 25 mm. are introduced every half-hour through a sieve of 35 litres capacity, located 3 metres above the level of the boiling liquid in the evaporator, into a dip tube which runs into the evaporator to a point about 475 mm. below the surface of the boiling liquid. As the sieve is kept at atmospheric pressure during the filling process, the dip tube fills with $TiCl_4$ to a height of 1200 mm. above the level of liquid in the evaporator, thereby compensating for the pressure of 200 g./cm.$^2$ in the evaporator.

On starting the process, about 30 kg. of aluminium chloride is introduced, so that the desired amount of aluminium chloride issuing as vapour is the same as the amount introduced every half-hour, namely 3.5 kg.

The $AlCl_3$, being introduced into the zone 6 through the sieve 7, meets the $TiCl_4$ at 5 in the tube. Under the effect of gravity, and also the frequent oscillation of the column of titanium chloride caused by boiling, this aluminium chloride passes down the whole length of the dip tube 4 without settling on its walls, and finally dissolves in the combined chloride mass which is heated to boiling by the heating system 10. Under these conditions it will be observed that the part 6 of the dip tube which does not contain titanium chloride is at atmospheric pressure, regardless of the pressure inside the evaporator, so that as a result the feed system 7 of the tube does not have to be very leakproof. Also the apparatus can be used in such a way that the level 5 of the $TiCl_4$ in the dip tube is outside the evaporator, which means that the titanium chloride immediately below this level 5 is at a temperature below the boiling point of the titanium chloride. The vapour pressure in the empty upper space 6 is thus low and can be reduced still further by cooling this part of the dip tube by cooler 11.

It is found that under these conditions the aluminium chloride fed into the dip tube does not cake together, and no objectionable condensation of titanium chloride occurs in the mechanical parts of the equipment which are used to introduce the aluminium chloride. Furthermore, with the free surface of the liquid titanium chloride being at atmospheric pressure and with the vapour pressure in the tube in the space above the said free surface being below, there is little risk of the evolution of fumes.

The present invention may equally well be applied to the production of a solution by the use of a dissolver as shown in FIG. 2. In this case the dip tube 4 is sufficiently long to ensure practically complete solution of the aluminium chloride before the $TiCl_4/AlCl_3$ liquid measure is removed by pipeline 12. Pressure is artificially maintained inside the dissolver so that the part of the liquid which is in the tube outside the volume of the tank may be cooled by cooler 11, thereby facilitating the feed of the aluminium chloride.

We claim:

1. A process for preparing a mixture of aluminium trichloride and titanium tetrachloride, which comprises heating a body of liquid titanium tetrachloride at its boiling point in a closed vessel having a tubular member extending downwardly into the vessel with the lower end of said member immersed in said body, said member having an upper portion extending upwardly from the vessel by the boiling of said body generating within said vessel a super-atmospheric pressure that maintains a column of liquid in said tubular member integral with said body yet elevated above the liquid level thereof, the upper end of said column being maintained under atmospheric pressure, introducing aluminium trichloride into the boiling liquid of said body via the upper end of said tubular member and through said column, and withdrawing from the vessel a mixture of aluminium trichloride and titanium tetrachloride.

2. A process according to claim 1 in which a liquid mixture comprising aluminium trichloride dissolved in titanium tetrachloride is withdrawn from the vessel at a level below the liquid level.

3. A process according to claim 1 in which a vapour mixture comprising aluminium trichloride vapour and titanium tetrachloride vapour is withdrawn from the vessel at a level above the liquid level.

4. A process according to claim 1 in which the column of liquid in the tube is elevated into said upper portion of the tube.

5. A process according to claim 4 in which said upper portion of the tube is artificially cooled to inhibit evaporation of the liquid from the column.

6. A process for continuously preparing a mixture of titanium tetrachloride with a desired minor proportion of aluminium trichloride which comprises providing a body of liquid titanium tetrachloride in a closed vessel having a tubular member extending downwardly thereinto with the lower end of said member immersed in the body, providing in said body a quantity of aluminium trichloride giving the desired proportion thereof in the liquid in the vessel, heating said body at the boiling point thereof and by the attendant super-atmospheric pressure within the vessel maintaining in said tubular member a column of the liquid substance integral with said body yet elevated above the liquid level of said body, the upper end of said column being maintained under atmospheric pressure, withdrawing the mixture from the vessel at a desired rate, introducing additional quantities of liquid titanium tetrachloride into the vessel at a rate sufficient to keep said body replenished, and introducing additional quantities of solid aluminum trichloride into said body via the upper end of said tubular member and through said column at a rate sufficient to maintain said desired proportion in said body.

References Cited

UNITED STATES PATENTS

| | | |
|---|---|---|
| 2,824,050 | 2/1958 | Marcot et al. |
| 2,980,509 | 4/1961 | Frey _____ 106—300 |
| 3,068,113 | 12/1962 | Strain et al. _____ 106—300 |
| 2,088,190 | 7/1937 | Du Pont _____ 23—309 |
| 3,168,379 | 2/1965 | Miller _____ 23—311 |

FOREIGN PATENTS 250,347  8/1960  Australia.

NORMAN YUDKOFF, Primary Examiner

U.S. Cl. X.R.

23—202; 106—300